United States Patent [19]

Doyle

[11] 4,311,407
[45] Jan. 19, 1982

[54] BAR OR ROD OR TUBE FRAME MULTI-POSITION ASSEMBLY CLAMP

[76] Inventor: Patrick Doyle, 163 W. 87th St., New York, N.Y. 10024

[21] Appl. No.: 204,976

[22] Filed: Nov. 7, 1980

[51] Int. Cl.³ .............................................. F16B 7/04
[52] U.S. Cl. .................................... 403/390; 403/400
[58] Field of Search ............... 403/390, 396, 400, 394, 403/391

[56] References Cited

U.S. PATENT DOCUMENTS 3,425,028   1/1969   Neaderland .......................... 403/390

FOREIGN PATENT DOCUMENTS 528167   7/1955   Italy ..................................... 403/391

*Primary Examiner*—Andrew V. Kundrat
*Attorney, Agent, or Firm*—Karl W. Flocks

[57] ABSTRACT

A bar or rod or tube clamp-type connector for assembling a frame to be covered by a woven fabric or tarpaulin or plastic film or sheet wherein the clamp-type connector comprises at least two rigid metal elements and one pierced resilient or cushioning element and wherein each rigid element includes a recessed portion having an inner friction surface which is grooved or knurled and a pierced flange having rounded corners extending therefrom and a bolt capable of being tightened by a nut and extending through the pierced flange of each rigid element and the pierced resilient or cushioning element, such clamp-type connector being capable of clamping two bars or rods or tubes in parallel or angular relation to produce a frame to be covered by material in contact with the frame and the rounded corners of the flanges of the connector elements.

1 Claim, 8 Drawing Figures

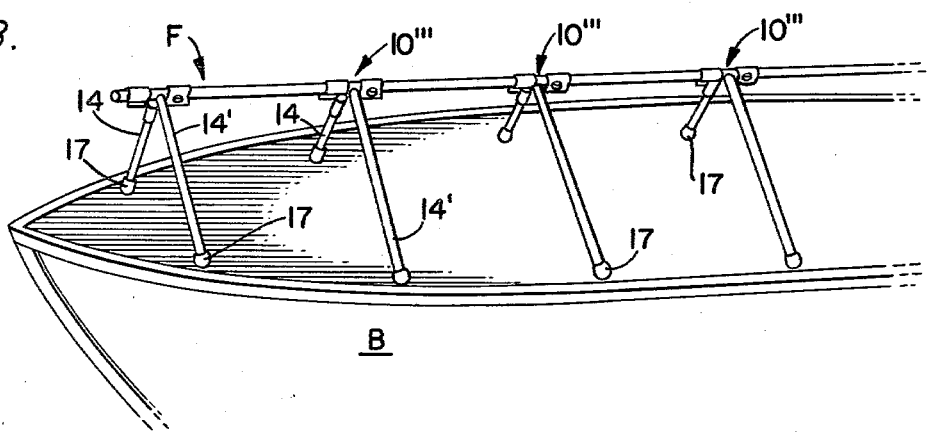
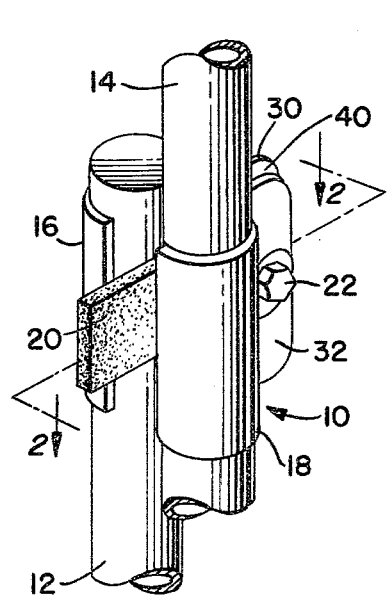
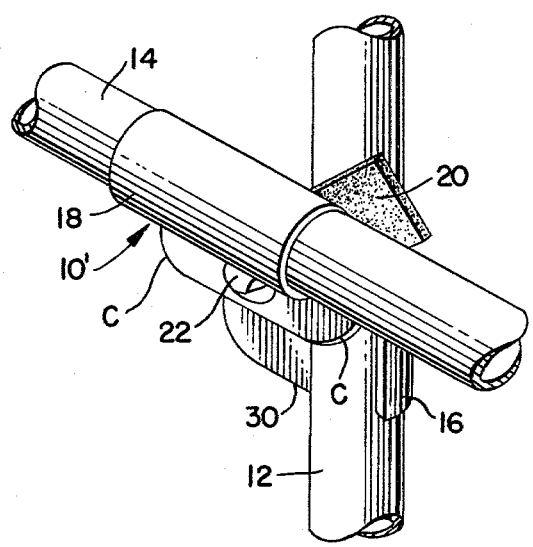
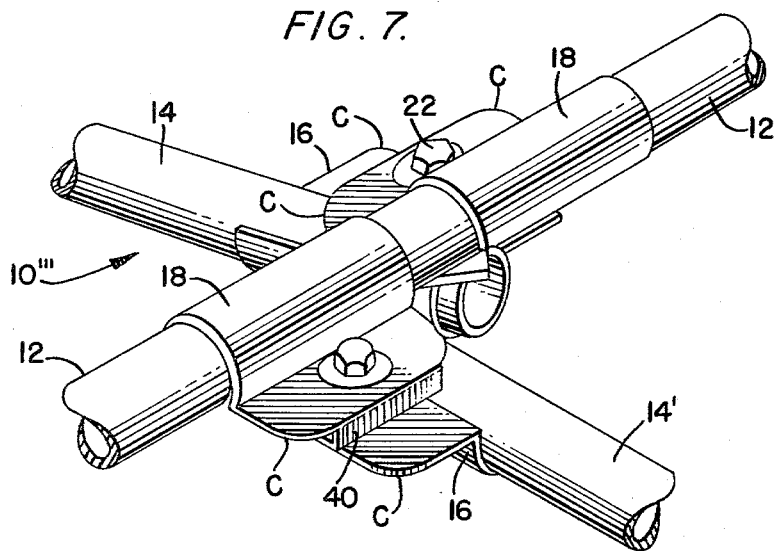

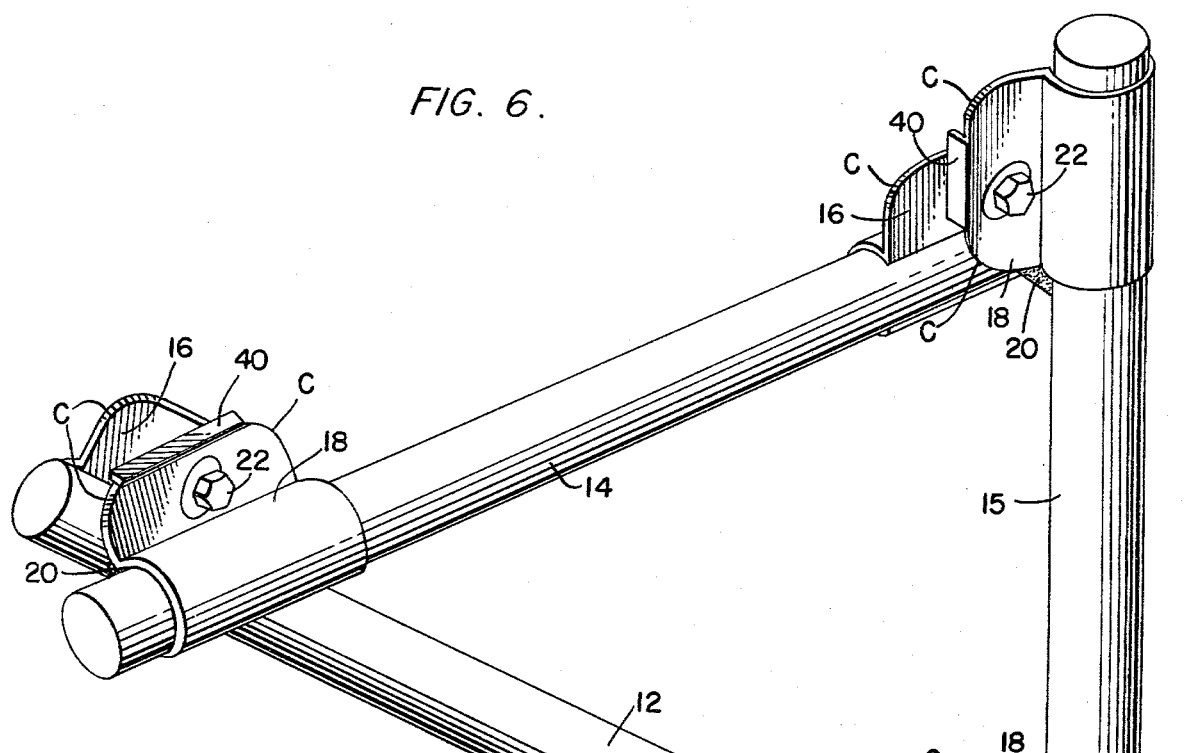
FIG. 6.
FIG. 4.
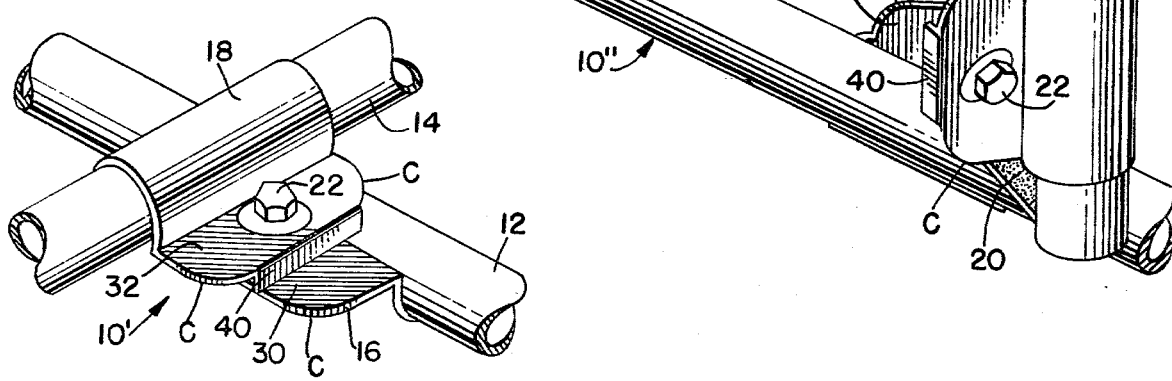
FIG. 2.
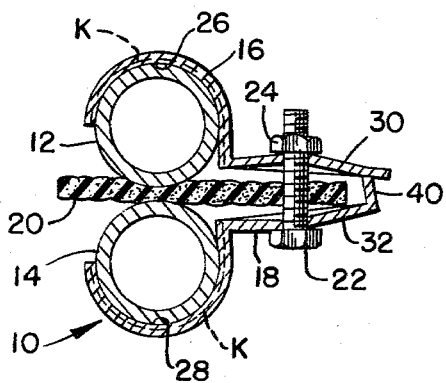
FIG. 3.
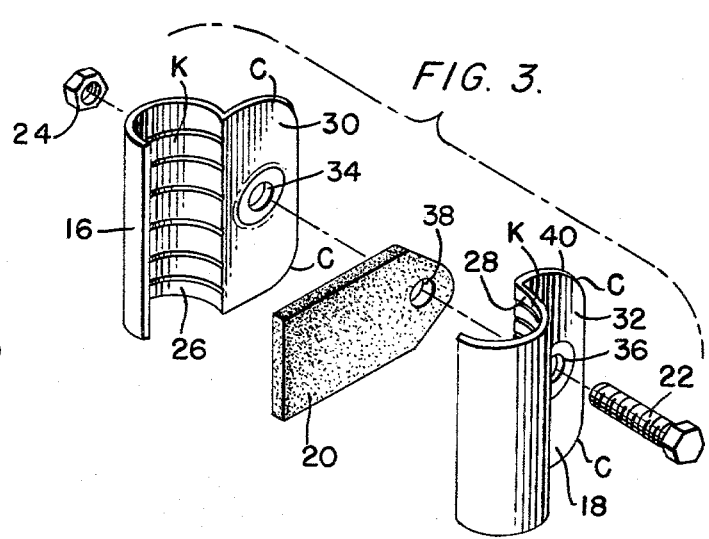

BAR OR ROD OR TUBE FRAME MULTI-POSITION ASSEMBLY CLAMP

FIELD OF INVENTION

The present invention relates generally to bar or rod or tube assemblies which may be readily assembled for temporary use and thereafter readily disassembled, and in particular to an improved multi-position clamp for use with such assemblies adapted to be fabric covered.

DESCRIPTION OF THE PRIOR ART

Bar or rod or tube frame assemblies are known in the prior art. See, for example, U.S. Pat. Nos. 2,001,215 (Ruppel—1935), 3,354,892 (Freider—1967) and 3,424,178 (Yazarki—1969). Generally, such an assembly may comprise a plurality of bar or rod segments whose ends are disposed in and secured together by socket members. In bar or rod assemblies used to support a boat canopy, some of the bar or rod members are telescoped within others and have registered openings in which lock pins or bolts are inserted. In one known assembly, some of the bar or rod segments have threaded ends which are screwed into mating threads in cooperating socket members, while other bar or rod segments have transverse openings adjacent the ends thereof which receive a lock pin or bolt when the ends are inserted into a socket provided with transverse apertures disposed in registration with the transverse openings of the bar or rod segments.

SUMMARY OF THE INVENTION

It is an object of the present invention to provide an improved bar or rod or tube frame assembly multi-position clamp which enables numerous variations of structural frames adapted to be fabric covered without injuring the fabric.

It is also an object of the present invention to provide an improved bar or rod or tube frame asembly multi-position clamp, provided with clamped flanges having rounded corners and friction surface recessed portions for engaging the bars, rods or tubes.

It is another object of the present invention to provide an improved bar or rod frame assembly multi-position clamp in which the relative direction or orientation of one bar or rod member with respect to another may be readily varied without cutting or tearing the fabric in contact with the frame.

It is still another object of the present invention to provide an improved bar or rod or tube frame assembly multi-position clamp which may be used to readily assemble bars or rods or tubes to form a framework to which a covering for a boat or swimming pool is secured without fear of tearing the covering.

These and other objects of the invention are achieved in a bar frame assembly multi-position clamp comprising first and second clamping members each including a first recessed and grooved or knurled portion adapted to receive a bar member and a second flange portion having rounded corners and adapted for securing the first and second clamping members together; a third clamping member adapted to be disposed between the first and second clamping members and the bar members received by the first and second clamping members; and means for securing the first, second, and third clamping members together and for clamping the bar members received in the first and second clamping members in one of various positions and fixed relationship with respect to each other.

These and other novel features of the present invention will be described in greater detail in the following detailed description.

BRIEF DESCRIPTION OF THE DRAWINGS

In the drawings, a bar frame assembly clamp and several bar or rod frame member assemblies constructed according to the present invention are illustrated, of which:

FIG. 1 is a perspective view of an improved bar or rod or tube frame assembly clamp constructed according to the present invention showing a pair of bar or rod members clamped together and extending in generally the same direction and in closely adjacent planes;

FIG. 2 is a cross-sectional view of the assembly clamp taken along section 2—2 of FIG. 1;

FIG. 3 is an exploded perspective view of the assembly clamp illustrated in FIG. 1 with the bar or rod members omitted;

FIG. 4 is a perspective view of a pair of bar or rod members clamped together in crossing relationship by the assembly clamp of the invention;

FIG. 5 is another perspective view of the bar or rod members and assembly clamp illustrated in FIG. 4;

FIG. 6 is a perspective view of a plurality of bar or rod members secured together in triangular relationship by the assembly clamp of the invention;

FIG. 7 is a top perspective view of a pair of bar or rod members secured together by the assembly clamp of the invention to a ridge pole which depend from the ridge pole as legs thereof; and FIG. 8 is a perspective view of a plurality of bar or rod frame assemblies of the type illustrated in FIG. 7 arranged in a series of like pairs of legs depending from a ridge pole supported above the deck of a boat.

DETAILED DESCRIPTION OF THE INVENTION

Referring now to the drawings, particularly FIGS. 1–3, there is shown an assembly 10 comprising two bar or rod members or segments 12 and 14, which may comprise tubular members, extending adjacent to each other. In the assembly 10, segments 12 and 14 are disposed generally parallel to each other and extend in generally the same direction as clamping members or elements 16 and 18 which are provided with rounded corners C and which retain segments 12 and 14, respectively, in secured and fixed relationship with respect to each other. An elongated third clamping member 20 is disposed between 12 and 14 to provide a stable assembly and may comprise a pad to prevent damage to the segments and dampen or eliminate vibration. Such a pad is preferably fabricated of rubber or other elastomeric material, and it may also comprise synthetic plastic material. Securing means is provided to draw or press clamping elements 16 and 18 toward each other and preferably comprises an elongated threaded bolt 22 and nut 24. Segments 12 and 14 each have at least a portion thereof extending adjacent to that of the other, and clamping elements 16 and 18 are provided with bar or rod recessed embracing portions 26 and 28 having inner surfaces K grooved or knurled and disposed along laterally outward surfaces of the segments. Recessed embracing portions 26 and 28 are generally of semi-cylindrical shape although they may conform to whatever cross-sectional shape may be given to segments 12 and 14.

Clamping elements 16 and 18 are arranged with embracing portions 26 and 28 in cradling relationship with segments 12 and 14. The grooved or knurled embracing portions 26 and 28 are concave-shaped or recessed to cradle, i.e., receive a bar or rod member therein. Each clamping element is provided with a transversely extending securing portion, illustrated as planar plates or flanges 30 and 32, respectively, which have rounded corners C. To facilitate securing the clamping elements together, plates or flanges 30 and 32 are provided with apertures 34 and 36, respectively, through which the securing means in the form of threaded bolt 22 is inserted, and on which nut 24 is threaded, to draw or press clamping elements 16 and 18 together and clamp bar or rod members 12 and 14 in secured assembly and in fixed relationship with respect to each other. To securely maintain clamping member 20 in assembly, the member is provided with an aperture 38 through which bolt 22 can be inserted when brought into registration with apertures 34 and 36 of plates 30 and 32, respectively.

Clamping element 18 differs in construction from clamping element 16 in that the former includes an abutment flange 40 having rounded corner C, whereas clamping element 16 which also have rounded corners C does not include such an abutment flange. As illustrated in FIG. 2, plates or flanges 30 and 32 are disposed at an acute angle with respect to each other and the angle is limited by the height of abutment flange 40. It should be noted, however, that the clamping elements need not be provided with abutment flange 40, and that a pair of clamping elements 16 may be used together. Alternatively, a pair of clamping elements 18 with abutment flange 40 may be used. It also should be noted that although in the assembly 10 illustrated in FIGS. 1-3, bar or rod segments 12 and 14 are disposed generally parallel to each other, the segments could also be disposed at an angle to each other, crossing each other at right angles as in the assembly 10' illustrated in FIGS. 4 and 5, or at any other angle. Assembly 10' may be readily formed piece by piece or by rearranging assembly 10 by loosening nut 24 on bolt 22, thus putting the clamp and assembly in a loosened condition which permits relative movement of the clamping elements and bar members with respect to each other, and rotating one of the segments 12 togehter with its clamping element 16, for example, about the axis of bolt 22, and thereafter tightening nut 24, thus putting the securing means in a tightened condition in which the clamping elements and bar members are secured in fixed relationship with respect to each other, and securing the assembly. The bar or rod segments may be clamped together so as to extend from 0° to 360° with respect to each other as desired. In assembly 10', third clamping member 20 is disposed between bar or rod members 12 and 14 as illustrated in FIG. 5. FIG. 6 illustrates another assembly 10" in which bar or rod members 12 and 14, assembled together by clamping elements 16 and 18, are each additionally clamped and assembled by the clamping elements to bar or rod member 15 to form a triangle.

It is to be understood that in accordance with the instant invention the clamp is capable of multiple positions so that the rods or bars or tubes may be connected at various angles with each other. Accordingly, it will be understood that the fabric canopy or cover, not shown, will be in contact with corners of plates or flanges 30 and 32 and abutment flange 40 which take different positions in different parts of the assembly which are disposed at different angles. It is beacuse of rounded corners C that cutting or tearing of the fabric or wearing at places of contact is prevented.

It is also to be understood that when vibration takes place, the members of the assembly are subject to stress tending to cause the rods or bars or tubes to slide in the embracing portions 26 and 28 of the clamping elements. This tendency to slide is prevented by the grooved or knurled inner surfaces K.

Accordingly, the curved corners C and the grooved or knurled inner surfaces K are necessary for the multi-positionable clamp to function when used in a framed assembly covered with fabric and subjected to motion or vibration as when used to cover a boat in the water.

In FIGS. 7 and 8, an alternative assembly 10''' is shown in which a framework F is provided over which a covering (not illustrated) for a boat B may be secured. In assembly 10''' bar or rod members 12 and 14 are secured to each other by clamping elements 16 and 18 and member 14 extends downwardly as a supporting leg from one side of member 12, which forms a ridge pole. A second rod member 14' extends downwardly from the other side of ridge pole 12 as a second supporting leg and forms an inverted "V" with member 14. Each of legs 14 and 14' may be provided with end caps 17 of plastic or elastomeric material to protect the deck of the boat and/or to minimize sliding of the framework F formed thereby. The framework may comprise any number of pairs of the bar or rod members 14 and 14'.

In the foregoing specification, the invention has been described with reference to specific examplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

I claim:
1. A multi-positional clamp for securing rods, bars, or tubes of various lengths in fixed positions and an various angles to produce a frame assembly adapted to be covered with a woven fabric or non-woven sheet, which frame assembly may be subject to motion or vibration, said clamp comprising:
 (a) at least two rigid clamping members and
 (b) at least one resilient flexible, deformable and cushioning member,
 (c) each rigid clamping member comprising
   (i) a rotatable flange portion having a flat slidable surface and rounded corners and
   (ii) a cradle or embracing portion having a grooved or knurled inner surface opposed to said resilient, flexible deformable cushioning member
 (d) each said flat flange portion having a single circular opening formed therein so that each said flat flange portion can be rotated individually about said single fastening bolt
 (e) a single fastening bolt means cooperating with said opening formed in each of said slidable flat surfaced flanges of the two rigid members and said resilient flexible, deformable and cushioning member and for holding together said flat slidable surfaces in fact to face contact after rotation into position
 whereby in the various positions of the clamp, one or more rounded corners of the flange portion will be presented for contact with the fabric or sheet cover and when the assembly is subjected to motion or vibration, the grooved or knurled inner surfaces of the cradle or embracing portions will overcome the tendency of the rods or bars or tubes to slide.

* * * * *